Jan. 9, 1940.  J. H. PENGILLY ET AL  2,186,342
MAGNETIC SWITCH
Filed May 20, 1937  8 Sheets-Sheet 1
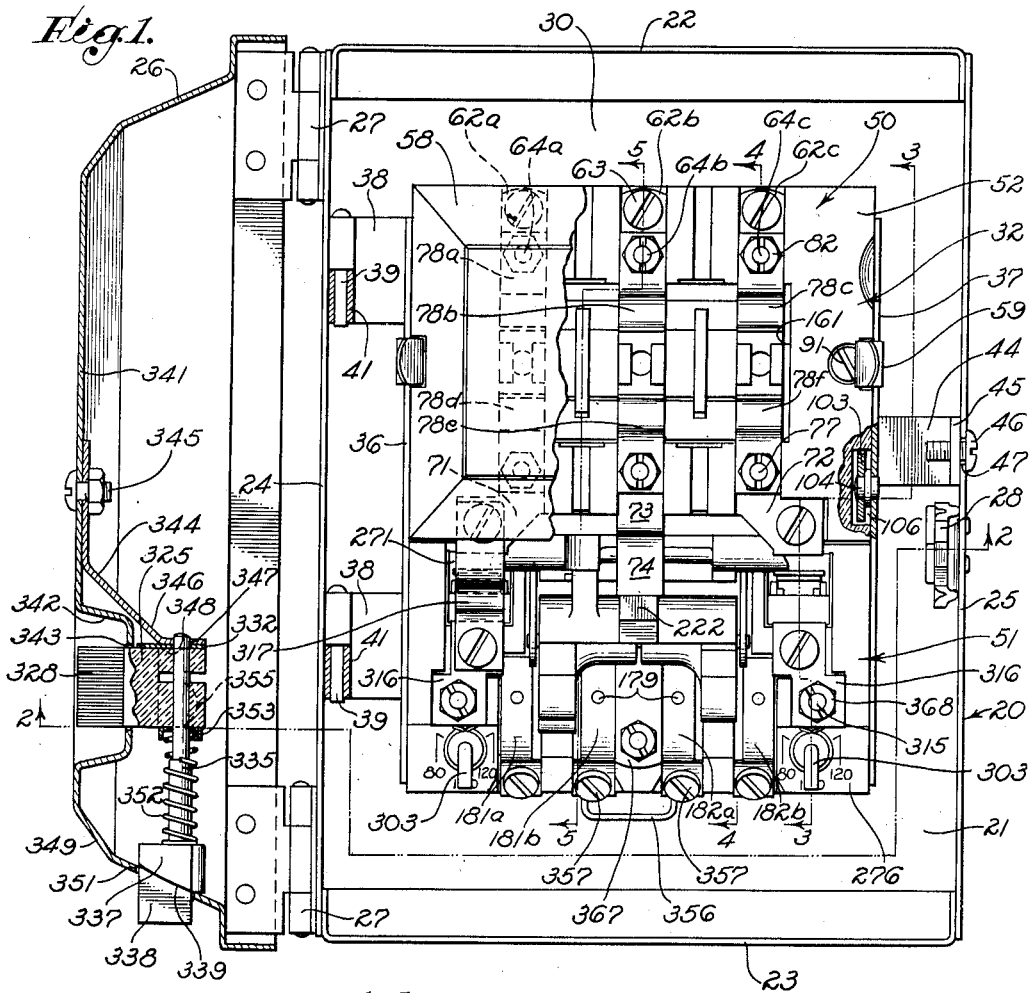
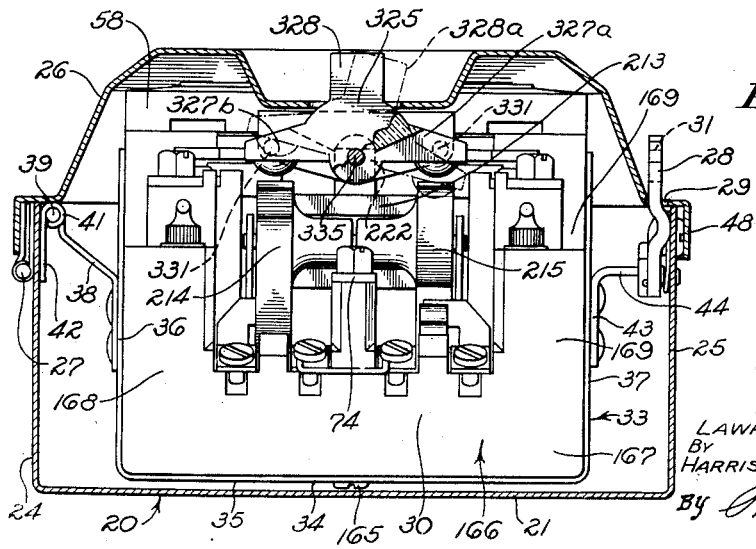
INVENTORS
JOSEPH H. PENGILLY
JOHN G. MOYEN
HAROLD A. DUVALL
LAWRENCE G. MAECHTLEN
BY HARRIS, KIECH, FOSTER & HARRIS
By Ward D. Foster
ATTORNEYS.

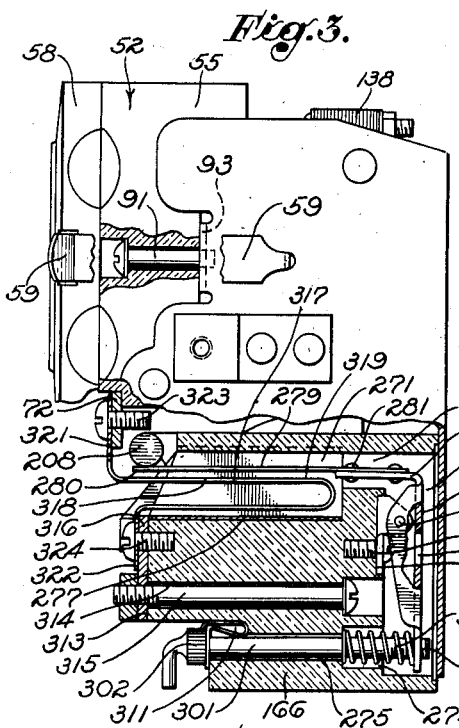
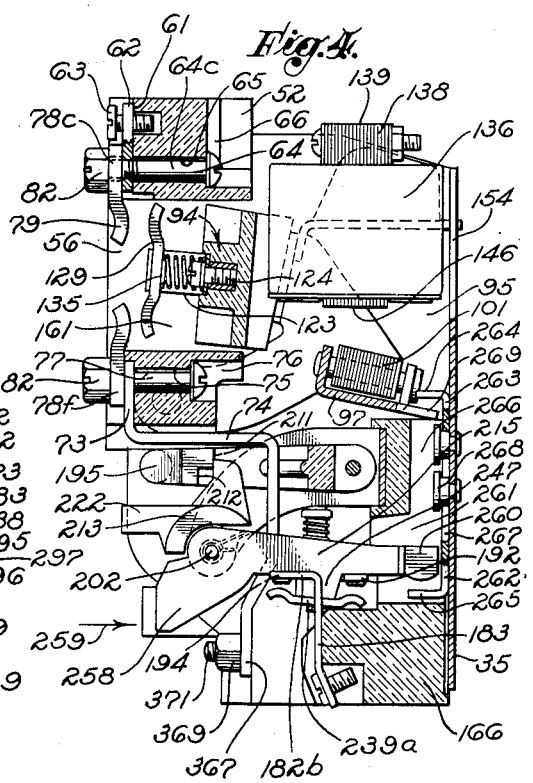
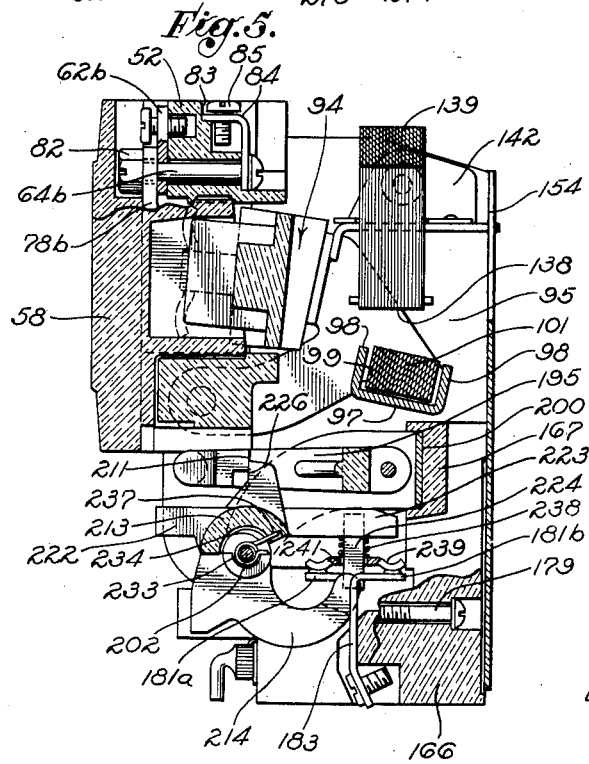
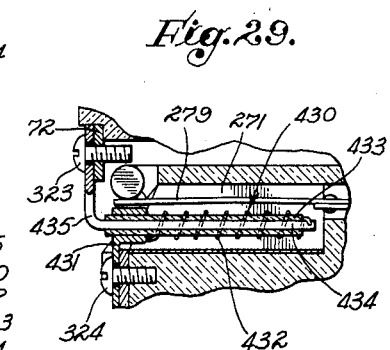

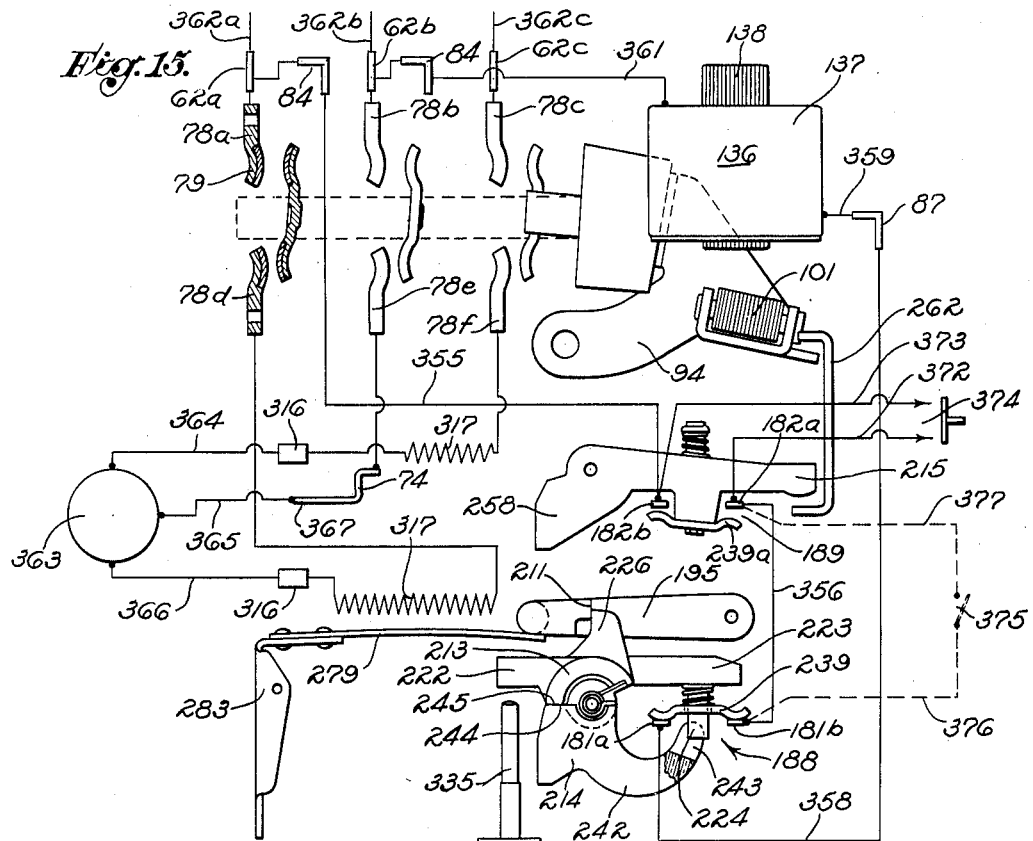
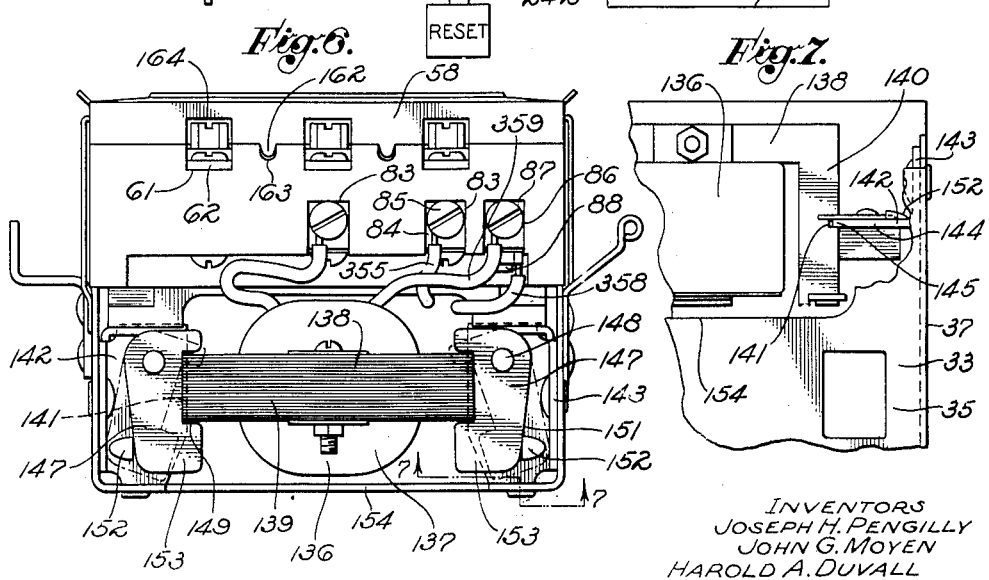

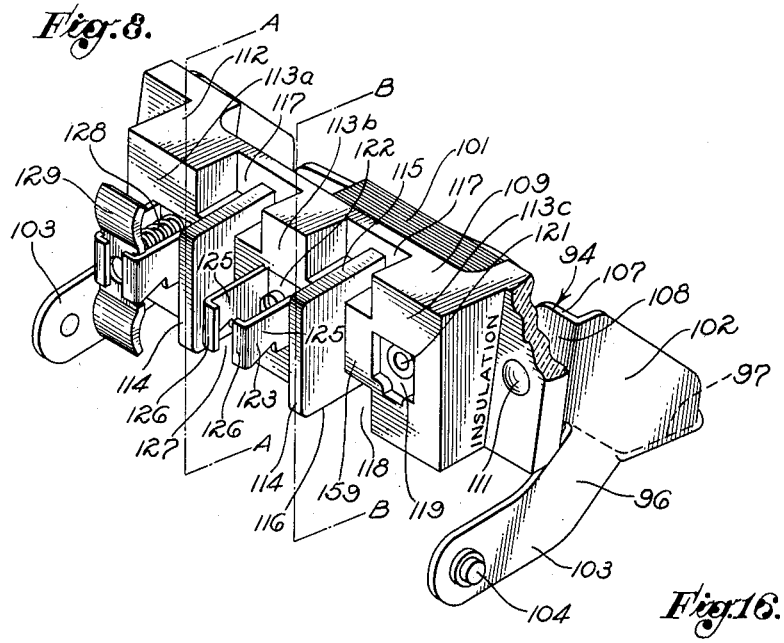
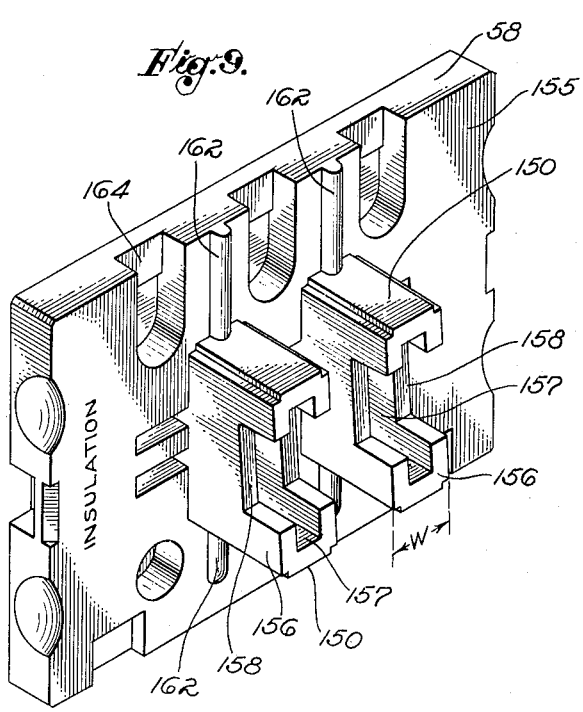
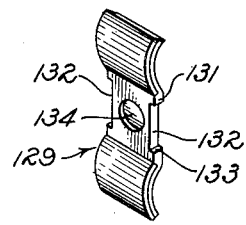
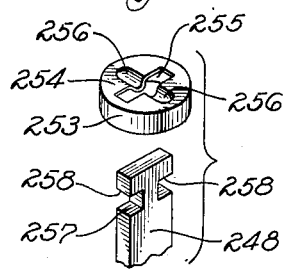

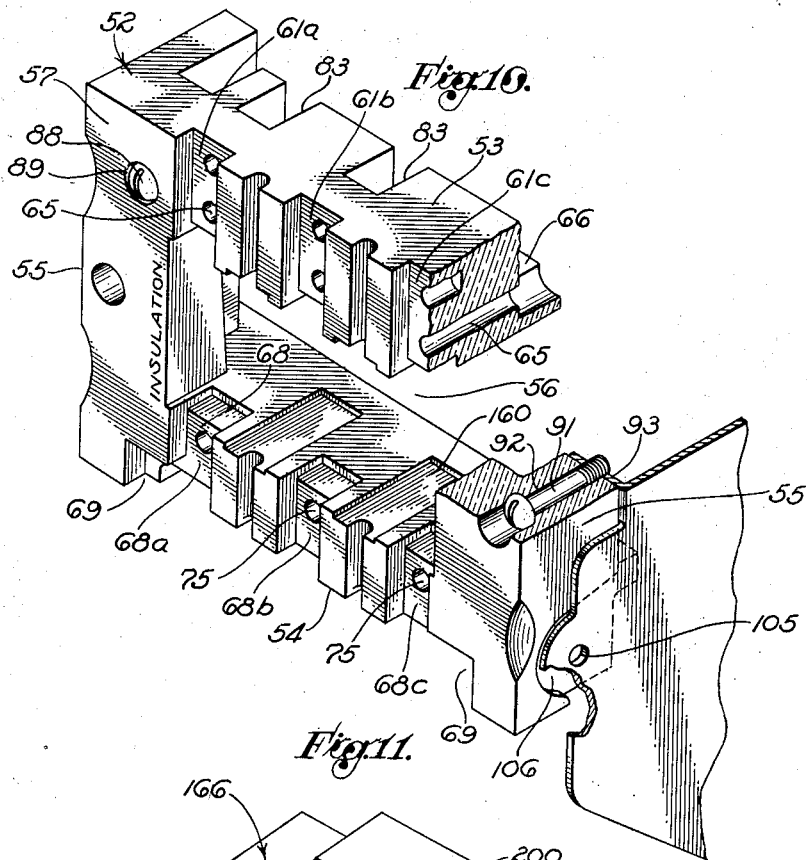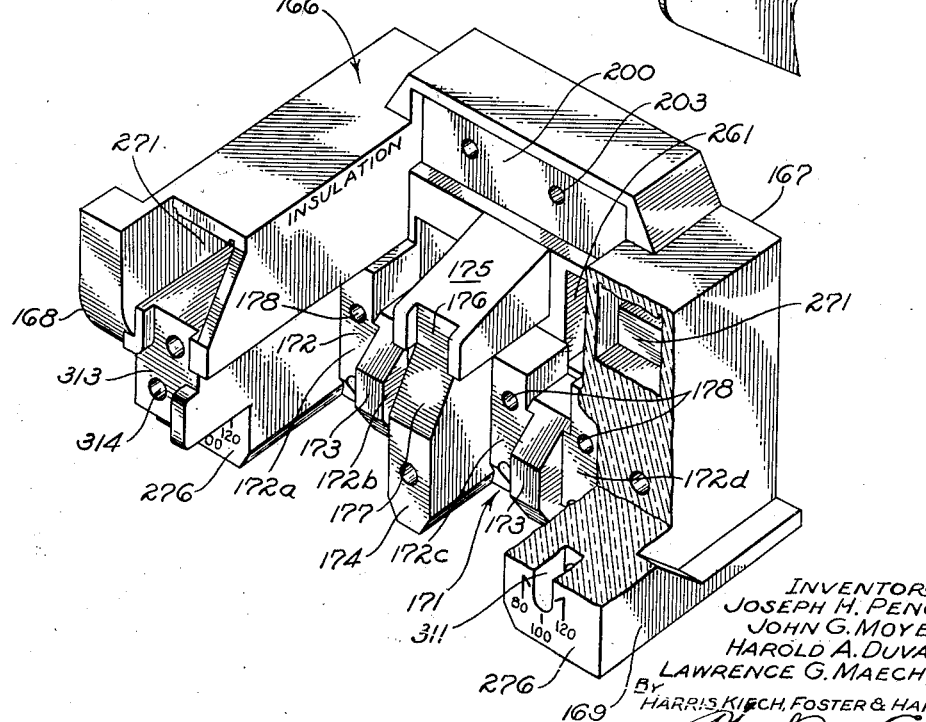

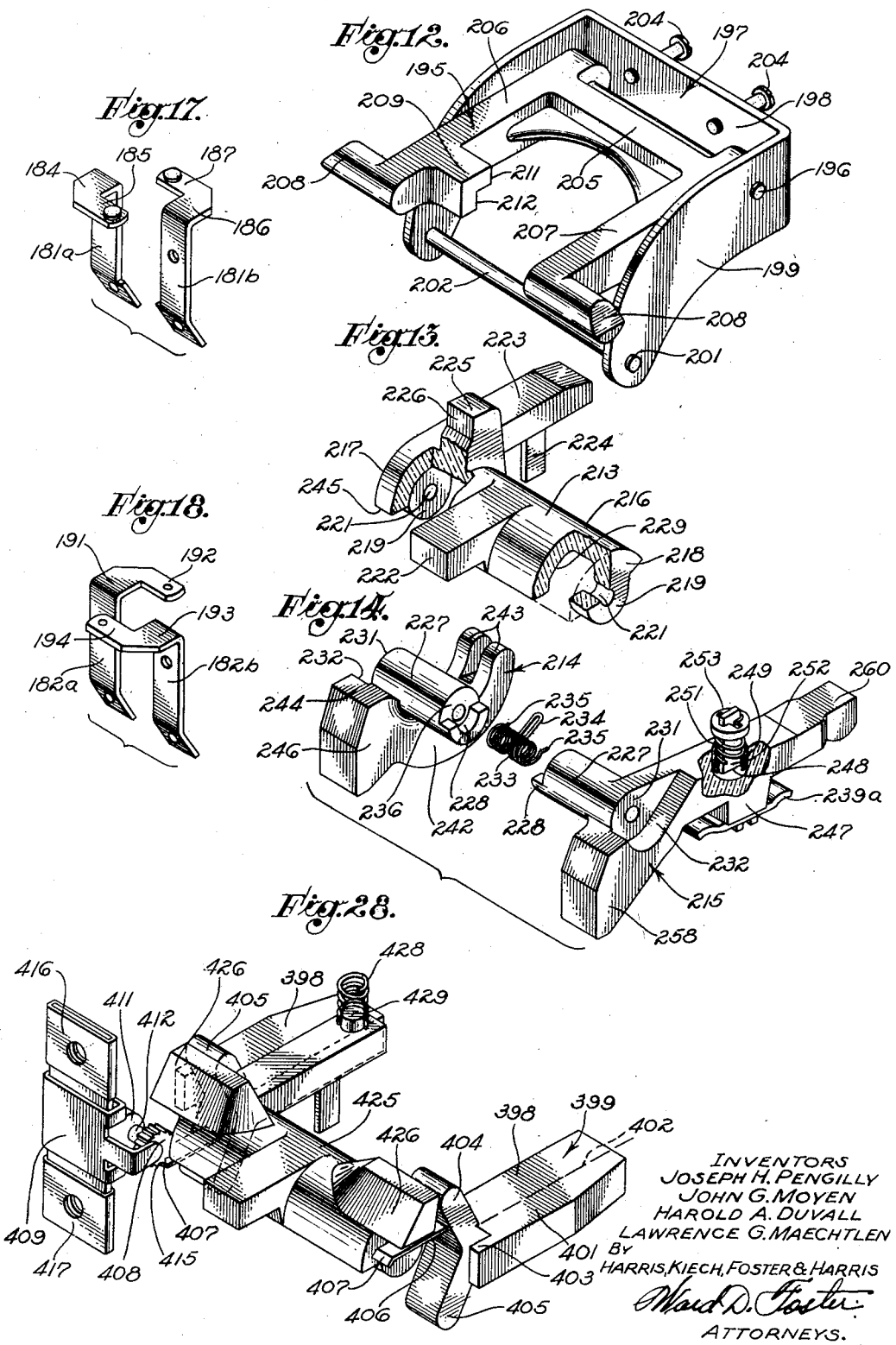

Jan. 9, 1940.   J. H. PENGILLY ET AL   2,186,342
MAGNETIC SWITCH
Filed May 20, 1937   8 Sheets-Sheet 7
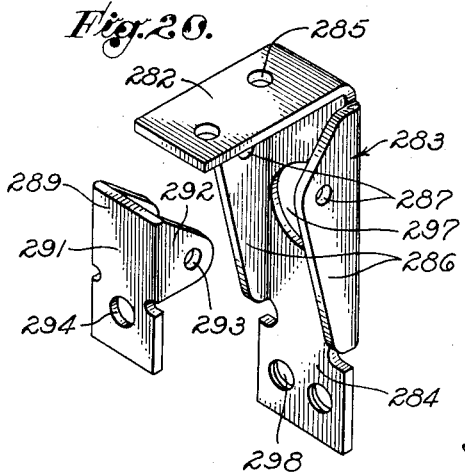
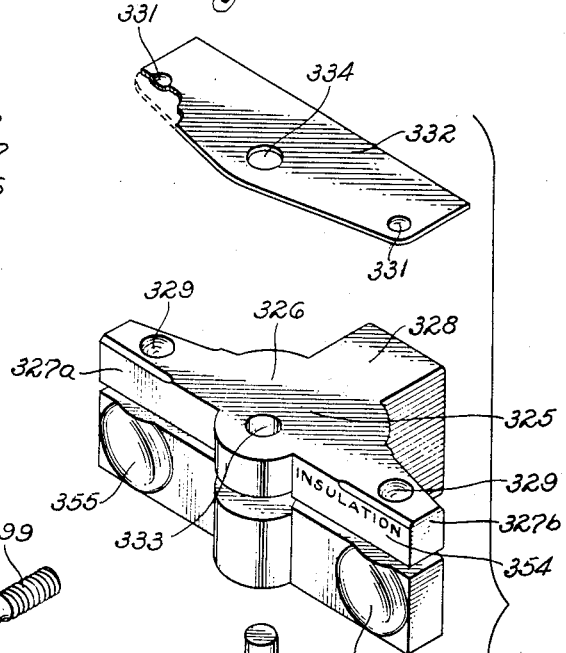
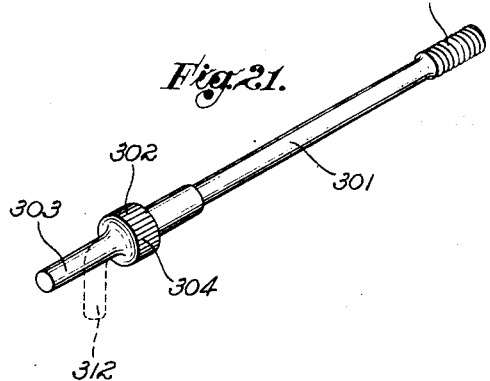
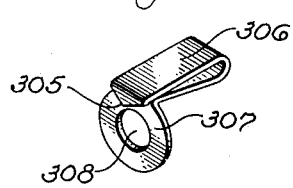
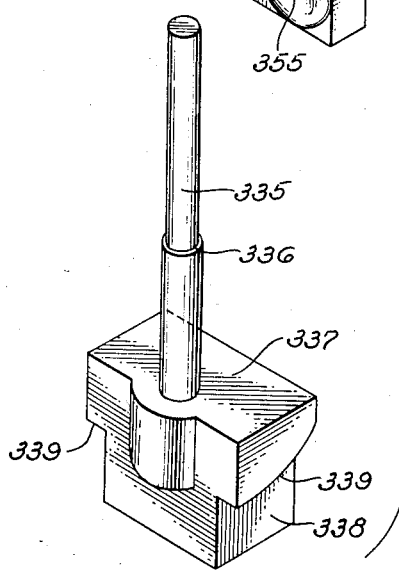
INVENTORS
JOSEPH H. PENGILLY
JOHN G. MOYEN
HAROLD A. DUVALL
LAWRENCE G. MAECHTLEN
BY HARRIS, KIECH, FOSTER & HARRIS
Ward D. Foster
ATTORNEYS.

Jan. 9, 1940.                J. H. PENGILLY ET AL                2,186,342
                                MAGNETIC SWITCH
                           Filed May 20, 1937        8 Sheets-Sheet 8
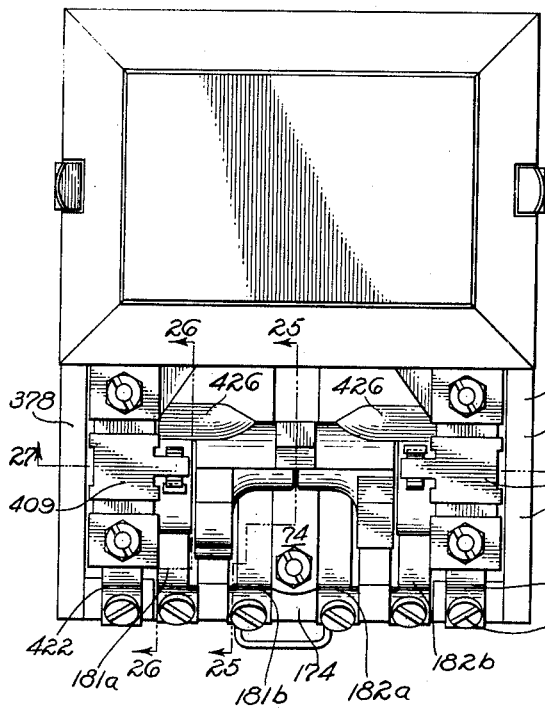
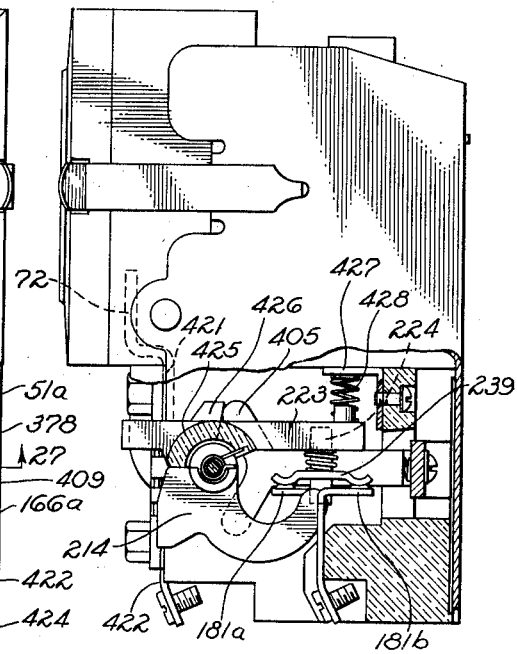
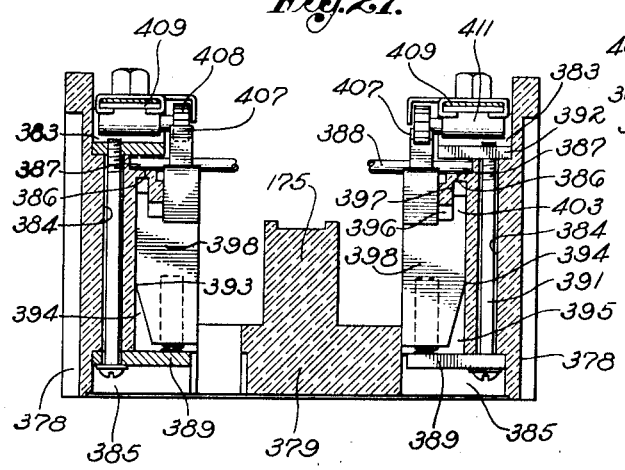
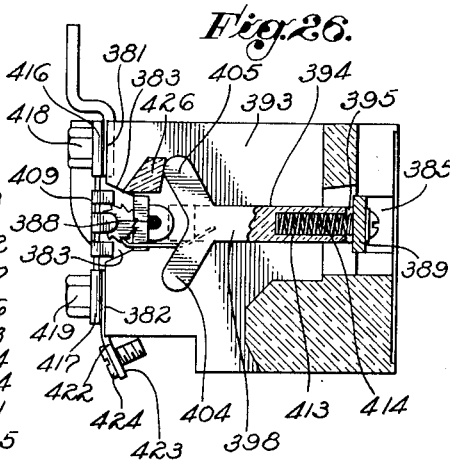
INVENTORS
JOSEPH H. PENGILLY
JOHN G. MOYEN
HAROLD A. DUVALL
LAWRENCE G. MAECHTLEN
BY HARRIS, KIECH, FOSTER & HARRIS
ATTORNEYS.

Patented Jan. 9, 1940

2,186,342

UNITED STATES PATENT OFFICE 2,186,342

MAGNETIC SWITCH

Joseph H. Pengilly, Los Angeles, John G. Moyen, Glendale, Harold A. Duvall, Los Angeles, and Lawrence G. Maechtlen, Beverly Hills, Calif., assignors to Square D Company, Detroit, Mich., a corporation of Michigan Application May 20, 1937, Serial No. 143,776

8 Claims. (Cl. 200—6)

Our invention relates in general to electrical switches, and relates in particular to a magnetically operated switch of simple and durable form adapted for use where either or both direct and remote control may be required.

It is an object of the invention to provide a switch unit and a box or case therefor wherein the switch unit is hinged in the case so that it may be swung from a position within the case to a position outside the case, and wherein the supporting means for the switch unit is so made that it may be completely disconnected from the case or box without the necessity of removing screws or nuts.

It is a further object of the invention to provide an electric switch having a switch unit including main switches and control switches, in which switch unit the contacts, actuating coil and magnet, terminals and relay adjustment means are all accessible without the necessity of disconnecting the switch unit from its box. Likewise, the switch unit has its contacts, terminals, and adjustment members disposed in positions facing forwardly, so that these parts are readily accessible from the front of the switch unit and from the front of the box or cabinet.

It is a further object of the invention to improve and simplify the switch contacts and their supports in such manner as to produce a switch structure wherein the contacts may be quickly and easily replaced should they become burnt. Also, the device is equipped with a cover plate which ordinarily seals the main switch contact but which may be readily removed to permit inspection of said contact.

It is a further object of the invention to provide the switch unit with means removably supporting the switch magnet so that such magnet may be readily replaced or so that a magnet of different voltage may be substituted therefor as operating conditions of the switch may require.

A further object of the invention is to provide a switch unit of the general character hereinbefore described having overload release means of simple form which may be easily secured in place and removed, thereby making it possible to quickly change the characteristic of the overload throw-out or release.

It is also an object of the invention to provide in conjunction with the overload release or throw-out a manually controlled means whereby the operation of the overload release may be accelerated or retarded in accordance with the desires or requirements of the user.

It is a further object of the invention to provide overload protection for the switch having an adjustable thermostat and rigid tamper-proof heater elements, and it is a further object of the invention to provide a switch unit wherein the main switch body and the control switch body are constructed separately, and whereby the control switch body may be readily replaced by another control switch body having solder pot type overload protection.

It is a further object of the invention to provide as a part of the switch unit a switch control means including a primary or stop switch which also serves as an overload trip switch, and having a secondary or start switch which serves also as a maintaining switch for the magnet hold-in circuit.

It is a further important object of the invention to provide a manually engageable switch operating lever, which is preferably of centrally pivoted type, and which is mounted in the cover of the switch cabinet so as to be a permanent accessory of the switch cabinet disposed in such position that when the door of the cabinet is closed, the operating means for the stop and start switches may be engaged and operated when the operating lever is swung into either stop or start position. In the preferred practice of the invention the operating lever has a manually engageable part projecting through an opening in the cabinet cover. By mounting the operating lever on the cabinet cover in a permanent manner with the manually engageable part projecting through an opening in the cover, the possibility of injuring the switch structure by closing the switch door or cover when the switch operating lever is out of alignment with an opening in the cover, is avoided. In this and other respects our present invention constitutes an improvement over the magnetic switch disclosed in Patent No. 1,995,896, issued March 26, 1935, to Pengilly et al, wherein a laterally swinging type of control lever is mounted within the cabinet and in such position that it will project through an opening in the cover when the cover is closed.

It is a further object of the invention to provide a switch device of the general character hereinabove described, having a reset mechanism forming a part of the switch unit mounted within the cabinet, and having in the door of the cabinet a manually operable reset member adapted for engagement with the reset mechanism when the cabinet door is in closed position. In the preferred practice of the invention the reset member includes a pin which also serves as a pivot for the switch control lever.

A further object of the invention is to provide a magnetic switch wherein vibration or humming of the magnet is avoided as the result of Parkerizing the magnet and armature and grinding the contacting faces of the magnet and armature so that a perfect fitting of the armature against the magnet is accomplished.

Further objects and advantages of the invention will be made evident throughout the following part of the specification.

Referring to the drawings, which are for illustrative purposes only.

Fig. 1 is a partly sectioned face view of a preferred form of the invention, with the door of the cabinet thereof in open position.

Fig. 2 is a cross section of Fig. 1, with the cabinet door thereof in closed position, this section being taken substantially as indicated by the line 2—2 of Fig. 1.

Fig. 3 is a sectional view of the switch unit taken as indicated by the line 3—3 of Fig. 1.

Fig. 4 is a sectional view of the switch unit taken as indicated by the line 4—4 of Fig. 1.

Fig. 5 is a sectional view of the switch unit taken as indicated by the line 5—5 of Fig. 1.

Fig. 6 is a plan view looking downwardly toward the upper face of the switch unit.

Fig. 7 is a fragmentary view looking toward a corner of Fig. 6, as indicated by the line 7—7 of Fig. 6.

Fig. 8 is an enlarged perspective view of the movable switch assembly of the main switch forming a part of the switch unit, partly assembled so as to show the characteristics of its construction.

Fig. 9 is a perspective view looking toward the rear face of the cover of the main switch body.

Fig. 10 is a partly sectioned perspective view, to enlarged scale, showing the service switch body of the device.

Fig. 11 is a partly sectioned perspective view, to enlarged scale, showing the control switch body of the device.

Fig. 12 is a perspective view of the overload latch and its supporting bracket.

Fig. 13 is a perspective view, partly sectioned, of the primary switch lever and reset yoke of the switch unit.

Fig. 14 is a perspective view showing the primary switch releasing lever, secondary switch lever, and the spring which cooperates therewith.

Fig. 15 is a wiring diagram of the preferred form of the invention.

Fig. 16 is an enlarged perspective view of one of the moving contact members of the service switch.

Fig. 17 is a perspective view showing the stationary contacts of the primary or stop switch of the control switch mechanism.

Fig. 18 is a perspective view showing the stationary contacts of the secondary or start switch of the control switch mechanism.

Fig. 19 is a fragmentary perspective view showing the means for applying a spring-holding cap to the end of a contact supporting bar.

Fig. 20 is a perspective view showing part of the adjustable supporting member for the thermostat.

Fig. 21 is a perspective view of the adjusting screw forming a part of the overload release mechanism.

Fig. 22 is a perspective view of the engager employed to resist rotation of the adjustment screw.

Fig. 23 is a perspective view showing three parts of the manual control mechanism of the switch.

Fig. 24 is a face view of the switch unit having a control unit employing a "solder-pot" type of overload release.

Fig. 25 is a side view of Fig. 24, partly sectioned as indicated by the line 25—25 of Fig. 24.

Fig. 26 is a section through the control switch mechanism taken as indicated by the line 26—26 of Fig. 24.

Fig. 27 is a sectional view taken as indicated by the line 27—27 of Fig. 24, some of the cooperating parts being omitted from this view.

Fig. 28 is a perspective view showing the releasing yoke, the thrust members associated therewith, and one of the solder-pot overload release members.

Fig. 29 is a sectional view of a part of the switch unit illustrated in Fig. 3 showing an alternative form of heater element.

In Figs. 1 and 2 of the drawings, we show a switch cabinet 20 having a back wall 21, top and bottom walls 22 and 23, side walls 24 and 25, and a cover or door 26 secured to the side wall 24 by means of hinges 27 so that the cover 26 may swing from open position as shown in Fig. 1 to closed position as shown in Fig. 2, the cover 26 being shown in section in each of the Figures 1 and 2. To hold the cover in closed position, a latch 28 is provided, this latch 28 passing through an opening 29 near the edge of the cover 26 and having an opening 31 in its outer portion through which the hasp of a padlock may be passed to lock the cover in closed position. The cabinet 20 is provided with knock-outs of ordinary character in the top, bottom, and side walls thereof, and also in the back wall 21 thereof, so that conduits may be extended from the cabinet in all directions except forwardly. From these conduits, not shown, conductors may be carried to a compact switch unit 32 which is mounted in the cabinet 20 in such position that it will have a space 30 extending across the top and bottom and along the sides thereof. Even though the cabinet is relatively small, the switch unit is of such compact character that there is ample room in the space 30 for running of wires.

The switch unit 32 has a supporting member 33 consisting of a plate 34 bent so as to provide a back 35 and two forwardly extending sides 36 and 37. The switch unit 32 is so supported that it may be easily installed and removed with relation to the cabinet 20, by means of brackets 38 having hinge pins 39 secured in downwardly extending position in the ends thereof so as to engage tubes 41 formed on cooperating hinge parts 42 which are secured to the inner face of the side wall 24 of the cabinet and near the forward edge thereof. The switch unit 32 may be swung on the hinge pins 39 from a position within the cabinet 20 to a position outside the cabinet, or, by lifting the switch unit 32 vertically, the pins 39 may be disengaged from the sockets or tubes 41, thereby disengaging the switch unit from the cabinet for any purpose desired, such, for example, as the replacement of one switch unit by another, or repair of the switch unit, it being contemplated, however, that the simple and rugged construction of the switch unit will obviate necessity for repair, except replacement of service switch contacts, which may be easily done as will be hereinafter described without the necessity of moving the switch unit from the position in which it is shown in Figs. 1 and 2.

Secured to the side wall 37 of the supporting member 33 is a bracket 43 having a lateral projection 44 extending toward the side wall 25 of the cabinet 20, and a forwardly extending end 45 lying in face-to-face relation to the inner surface of the side wall 25 and having a clamping screw 46 threaded therein and passing through a notch 47 in the edge of the side wall 25. When the switch unit 32 is in the cabinet 20, the screw 46 may be tightened so as to clamp the side wall 25 against the end 45 of the bracket 43, thereby preventing the switch unit from being swung out of the cabinet or out of the position in which it is shown in Figs. 1 and 2. When the door 26 is closed, as shown in Fig. 2, the lip 48 thereof covers the screw 46.

The switch unit 32 comprises a service unit 50 and a control unit 51, both of which are secured between the side walls 36 and 37 of the supporting member 33. The service unit 50 is above the control unit 51, and the parts thereof will be first described as follows: Secured between the upper forward edges of the side walls 36 and 37 is a service switch body 52, which is molded from a durable arc-resistant material in the form shown in Fig. 10, so as to include a top wall 53, bottom wall 54, and side walls 55, these walls defining a switch contact opening 56. The body 52 has a plain front face 57 against which a molded cover 58 is held by means of spring clips 59 which are secured to the side walls 36 and 37 of the supporting member 33, as shown in Figs. 1 and 3.

In the front face of the wall 53 are three vertical slots 61, individually indicated as 61a, 61b, and 61c, adapted to receive terminal plates 62 which are indicated as 62a, 62b, and 62c, each of which has a terminal screw 63 therein, as also shown in Figs. 1 and 4. These terminal plates 62 are held permanently in place by screws 64, referred to as 64a, 64b, and 64c, each extending through an opening 65 in the wall 53 of the body 52 so as to connect the slots 61 with a recess 66 in the back of the wall 53, wherein the heads of the screws 64 rest. The screws 64 make threaded engagement with the plates 62, thereby holding them firmly seated in the bottoms of the slots 61.

As shown in Fig. 10, in the face of the bottom wall 54 of the body 52 are slots 68, referred to as 68a, 68b, and 68c, vertically aligned with the slots 61. The slots 68a and 68c have lateral wings 69 so that L-shaped connector plates 71 and 72 may be placed therein. The slot 68b receives the upper end 73 of a strap 74 which extends down into the cotnrol unit 51 for a purpose which will be hereinafter described. From the bottoms of the slots 68 openings 75, with counterbores 76 at the rear ends thereof, are formed in the lower wall 54 to receive screws 77 which pass through and have threaded engagement with the connector members 71, 72, and 73.

Removable and replaceable stationary contact plates 78, referred to as 78a, 78b, and 78c, Figs. 1, 4, and 15, are placed in the slots 61 with the contact ends 79 thereof projecting downwardly into the forward part of the opening or space 56 of the service switch body 52, and other contact plates 78, reefrred to as 78d, 78e, and 78f, are placed in the slots 68 with the contact ends 79 thereof projecting upwardly into the forward part of the opening 56. As shown in Fig. 15, these contact plates 78 have openings 18 therein through which the outer ends of the screws 64 and 77 pass. The contact plates 78 are held tightly against the members 62 in the slots 61, and the members 71, 72, and 73 in the slots 68, by clamping nuts 82 which thread onto the forward ends of the screws 64 and 77.

As shown in Figs. 6 and 10, there are recesses 83 behind the slots 61a and 61b, and connector clips 84, of the form shown in Fig. 5, are secured under the heads of the screws 64a and 64b and are extended into the recesses 83, wherein the clips hold terminal screws 85 to which conductors are attached, as hereinafter set forth. To one side of the recesses 83 is a recess 86 in which a bent connector strip 87 is secured by means of a bolt 88 which projects through an opening 89 in the upper part of the left side wall 55 of the body 52. The body 52 is secured between the upper forward portions of the side walls 36 and 37 of the supporting member 33, with its front face 57 in a plane parallel to the back wall 21 of the cabinet 20, by means of screws 91 which project through openings 92 in the side walls 55, and, as shown in Fig. 10, make threaded engagement with the tongues 93 which are bent inwardly from the side walls 36 and 37 of the supporting member 33.

A movable switch assembly 94 is supported between the side walls 36 and 37 in such a position that it will rest partly within the space 95, Figs. 4, 5, and 10, behind the body 52, and partly within the opening 56 of the body 52. As shown in Fig. 8, the assembly 94 includes a metal supporting frame 96, stamped and bent from sheet metal so as to form a transverse wall or plate 97 having flanges 98 along its edges, Figs. 4 and 5, to form a channel 99 in which a laminated armature 101 is held. At the ends of the plate 97 are walls 102 lying in planes perpendicular to the plate 97. From these walls 102, lever arms 103 extend forwardly and have laterally projecting trunnions 104 adapted to project into openings 105 in the side walls 36 and 37. The outer faces of the body side walls 55 have recesses 106, Figs. 1 and 10, into which the forward ends of the levers 103 project when the trunnions 104 are in engagement with the openings 105. Tongues 107 are formed on each of the side walls 102, these tongues 107 being bent so as to extend toward each other and to form shoulders or plates 108 against which a movable switch body 109 may be secured by means such as rivets or screws 111.

The body 109, as shown in Fig. 8, is molded from a durable arc-resistant material so as to provide a forwardly projecting portion 112 to extend into the opening 56 of the body 52. This projection 112 of the body 109 is divided into three sections 113, referred to as 113a, 113b, and 113c, separated by vertical planes A—A and B—B defined by dividing walls 114 and being perpendicular to the plane of the front face of the body portion 112. The upper and lower edges 115 and 116 of the walls 114 project into upper and lower recesses 117 and 118 formed in the body portion 112 in centralized relation to the planes A—A and B—B.

In the front face of each section 113 is a cavity 119, and in the bottoms of these cavities 119 threaded insert bushings 121 are located, as shown in the section 113c. In each of the cavities 119, the base 122 of a contact holder 123 is seated, as shown in section 113b of Fig. 8, by a screw 124 which passes through the base 122 in the manner shown in Fig. 4. Each contact holder 123 has a pair of flat side walls 125 extending forwardly from its base 122 in parallel and spaced relation, and inwardly faced flanges 126 are formed at the forward ends of the side members 125 in such a manner that a vertical slot or opening 127 is left between the inner edges of the flanges 126.

Within each contact holder 123 is a coil spring 75

128 having its axis substantially coinciding with the axis of the screw 124 by which the contact holder is held in place and which likewise secures the inner end of the spring 128. The outer end of each spring 128 presses outwardly against a movable contact 129 made as shown in Fig. 16 so as to have a central plate portion 131 of a width greater than the width of the space between the side walls 125 of the contact holder 123. In the edges of the plate portion 131 there are shallow slots 132 in which the side members 125 may extend when the contact 129 is installed, as shown in Fig. 8, there being shoulders 133 at the upper and lower ends of the slots 132 for engaging the upper and lower edges of the side walls 125. The center of the plate portion 131 is depressed rearwardly in a circular area 134 so that a circular boss 135 will be formed on the rearward face of the contact 129 to fit into the forward end of the cooperating spring 128, as shown in Fig. 4.

Each contact 129 may be easily placed in or removed from its holder 123 without the use of tools. To install a contact 129, it is merely moved into the slot or mouth 127 of the holder in edgewise position, depressing the spring 128 which forms a part of the holder. After the contact is moved into a position within the flanges 126 of the holder, it is rotated on its longitudinal axis into the position shown in Figs. 4 and 8. Should any contact 129 become burnt so that its replacement is desired, it may be readily removed, after removal of the cover 58 from the front of the switch body 52, by reversing the foregoing operation. Also, the stationary contacts 78 may be readily removed from the front, by taking the nuts 82 off of the outer ends of the screws 64 and 77, whereupon the contacts 78 may be lifted from the positions in which they are shown in Figs. 1 and 4.

In the upper part of the space 95, Fig. 4, an electromagnet 136 is removably supported, the electromagnet 136 comprising a coil 137 and a field member 138 consisting of lamina 139. The side bars 140 (Fig. 7) of the field member 138 each have a slot 141 extending laterally across the outer face thereof. Near the upper edges of the side walls 36 and 37 of the support 33, brackets 142 are secured. Each bracket 142 has a vertical wall 143 which rests against the inner face of the wall 36 or 37, and a horizontal wall or plate 144, the inner edges 145 of the walls 144 projecting into the slots 141 of the side bars 140 to support the electromagnet 136 in such position that the lower face 146 of the field member 138 will be disposed above the armature 101 and in a substantially horizontal plane.

When the electromagnet 136 is energized, the armature 101 will be attracted upwardly, rotating the movable switch assembly in anti-clockwise direction from the position in which it is shown in Figs. 4 and 5, thereby carrying the movable switch body 109 outwardly or leftwardly in the opening 56 of the stationary switch body 52 and bringing the respective movable contacts 129 into engagement with the stationary contacts 78. The armature 101 is so designed relative to the weight of the moving assembly that if the assembly moves at all it will move to its closed position; that is to say, the pick-up voltage is equal to or greater than the seal voltage.

The contact holders 123 support the contacts 129 in such positions relative to the axis of rotation of the movable switch assembly defined by the trunnions 104 that these contacts 129 are given a small sliding or wiping movement as they are brought into circuit-closing engagement with the contacts 78.

The electromagnet 136 may be readily installed in and removed from the operative position in which it is shown. It may slide horizontally on the edges 145 of the brackets 142 which are equipped with latch plates 147, as shown in Figs. 6 and 7, adapted to be swung between the full line and dotted line positions in which they are shown in Fig. 6. Each latch plate 147 is pivoted on a rivet 148 and has a notch 149 in its inner edge, of a size to receive the outer portion of a side bar 140 of the field member 138. The latch plates 147 hold the electromagnet securely in place when the latch plates are in the full line positions shown in Fig. 6, and at such time the outer edges 151 of these latch plates 147 engage stops 152 pressed upwardly in the walls 144 of the bracket 142. When it is desired to remove the electromagnet, the ends 153 of the latch plates 147 are raised to clear the stops 152, and the latch plates 147 are rotated into their dotted line positions, whereupon the electromagnet may be slid rearwardly along the edges 145 of the brackets 142 and then cut through an opening 154 in the rear wall 35 of the supporting member 33.

As shown in Fig. 9, the cover 58 of the service switch unit 50 has an essentially flat rear face 155 adapted to fit against the front face 57 of the switch body 52. Projecting rearwardly from the rear face 155 are two projections 156, each having a width $w$ slightly less than the width of the recesses 117 of the movable switch body 109, and having top and bottom faces 150 adapted to rest in shallow flat-bottomed channels 160 in the inner faces of the walls 53 and 54 of the switch body 52, Fig. 10. The projections 156 have slots 157 therein of a size to receive the walls 114 of the movable switch body 109 and in which said walls 114 may move forwardly and rearwardly as said switch body 109 moves between open and closed positions. Each of the projections 156 has notches 158 facing rearwardly so as to clear the wall elements 159 of the movable switch body 109. The projections 156, in combination with the dividing walls 114, divide the space 56 of the switch body 52 into three separate switch chambers 161 which are of small volume and are sufficiently sealed from the external atmosphere as to be very effective in extinguishing arcs that may be produced in the switch members 161. To seal between the electric parts contained in the slots 61 and 68 of the switch body 52, ribs 162 are formed on the rear face 155 of the cover 58, in positions to fit into grooves 163 in the front face 57 of the body 52 between the notches 61 and 68. Also, recesses 164 are formed in the rear face 155 of the cover 58, in alignment with the slots 61a to clear the forward ends of the screws 64, the nuts 82 thereof, and the terminal screws 63 carried by the plates 62.

Removably secured between the lower portions of the side walls 36 and 37 of the supporting member 33, by means of a single screw 165, is a control switch body 166 having, as shown in Figs. 2 and 11, a back wall 167 and a pair of forwardly extending side walls 168 and 169. From the lower portion of the back wall 167, and between the side walls 168 and 169, is a relatively short bottom wall 171 having four vertical grooves 172, referred to as 172a, 172b, 172c and 172d, the grooves 172a and 172b, and the grooves 172c and 172d being separated by relatively short dividing walls 173. The grooves 172b and 172c are separated by a dividing wall of intermediate height, and extending forwardly from the back wall 167 at the top of the dividing wall 174 is a pillar or buttress 175 having a guide groove 176 in the front end thereof aligned with the forward face 177 of the dividing wall 174.

From the bottom walls of the grooves 172, openings 178 extend rearwardly through the bottom wall 171 of the control switch body 166 to receive screws 179, Figs. 1 and 5, which hold stationary control contact members 181a, 181b, 182a and 182b, respectively, in the grooves 172a, 172b, 172c and 172d. The contacts 181a, 181b, 182a and 182b have vertical plates or strip portions 183 which lie respectively in the grooves 172. The contact 181a, as shown in Fig. 17, has a horizontal portion 184 bending forwardly from the upper end of its plate portion 183 and having a rightwardly turned tongue 185. The contact 181b cooperates with the contact 181a in forming the stationary contact of a primary or stop control switch 188, Fig. 15, and has a horizontal portion 186 bending rearwardly from the upper end of its plate portion 183 with a leftwardly directed tongue 187, the tongues 185 and 187 lying in the same horizontal plane and being substantially centralized on a vertical plane which is disposed at a right angle to the back wall 35 of the supporting member 33.

The contacts 182a and 182b, Figs. 15 and 18, cooperate in forming part of a secondary or start control switch 189. The contact 182a has a rearwardly extending horizontal portion 191 with a rightwardly extending tongue 192, and the contact 182b has a forwardly extending horizontal portion 193 with a leftwardly directed tongue 194.

In the upper part of the space between the side walls 168 and 169 of the body 166, a stop switch latch 195 is supported on a shaft 196 carried by a bracket 197, as shown in perspective in Fig. 12. The bracket 197 comprises a stamping including a base 198 and a pair of forwardly extending arms 199, the forward ends of which curve downwardly and have openings 201 therein to receive a horizontal shaft 202. As shown in Figs. 5 and 11, the upper part of the back wall 167 has a forwardly faced shallow cavity 200 to receive the base 198 of the bracket 197. Holes 203 are provided in the back wall 167 through which bolts 204 are extended to secure the bracket 197 in the position in which it is shown in Figs. 4 and 5.

The latch 195 is molded from a suitable dielectric material, such as Bakelite, and has a rear bar 205 in a laterally extending and horizontal position, and side bars or levers 206 and 207 which project forwardly from the ends of the rear bar 205 and have dogs 208 at the forward ends thereof which project laterally and outwardly in opposite direction so as to lie in positions to be engaged by electro-responsive overload release means, as will be hereinafter described. On the inner face of the bar or lever 206 is a projection 209 having a rearwardly faced latch shoulder 211 and a second shoulder 212 which lies below and is spaced forwardly from the shoulder 211.

The shaft 202 is adapted to support a yoke member 213, shown in perspective in Fig. 13, together with a stop switch releasing lever 214 and a start switch lever 215, both of which are shown in perspective in Fig. 14.

The yoke 213 has a semi-cylindrical wall 216, the length of which is nearly as great as the length of the exposed portion of the shaft 202 between the arms 199 of the bracket 197. At the ends of the walls 216 there are end walls 217 and 218, each of which has a lower portion 219 of semi-circular form and an opening 221 to receive the shaft 202. From the center of the yoke wall 216, a projection or dog 222 extends forwardly in a horizontal plane. From the leftward end of the semi-cylindrical wall 216, a primary or stop switch lever 223 extends rearwardly, this lever having a downwardly extending bar 224 projecting therefrom. Near the leftward end of the semi-cyclindrical wall 216 is an upwardly projecting latch lug 225 having a forward face 226 for engaging the shoulder 211 of the latch member 195 when the yoke 213 is rotated rearwardly as will be hereinafter described.

The releasing lever 214 and the switch lever 215, as shown in Fig. 14, both have a cylindrical body 227, these bodies 227 projecting toward each other and having semi-circular walls 228 at the inner ends thereof. When the cylindrical bodies 227 are assembled on the shaft 202, the inner arcuate walls 228 are in engagement. The diameter and the combined length of the cylindrical bodies 227 are such that they will fit in the semi-cylindrical channel 229 formed in the cylindrical wall 216 of the yoke 213 in downwardly facing relation, the end faces 231 of the bodies 227 resting at this time against the inner faces of the end walls 217 and 218 of the yoke 213, and with notches 232 formed adjacent the faces 231 receiving the lower semi-circular portions 219 of the end walls 217 and 218. A coil spring 233 is disposed on the shaft 202 between the faces 236 of the members 227, this coil spring 233 having a central loop 234 projecting radially and having ends 235. The ends 235 of the spring 233 project radially and bear downwardly against shoulders 236 formed at the rear of the semi-circular walls 228 of the members 227, thereby exerting a resilient force on each member 214 and 215 to rotate it in clockwise direction. As best shown in Fig. 5, the loop 234 of the spring 233 engages a shoulder 237 in the rear edge of the wall 216 of the yoke 213, and imparts to the yoke 213 a resiliently applied force tending to rotate the yoke 213 and its attached switch lever 223 in anti-clockwise direction.

As shown in Fig. 5, the switch lever 223 is so positioned that the bar 224 projects toward the contacts 181a and 181b in centralized relation thereto. A coil spring 238 is placed over the bar 224, and then a contact plate, or moving contact member 239, having an opening 241 therein, is moved upwardly over the end of the bar 224 into engagement with the spring 238. When the yoke 213 is in latched position, that is, with the face 226 thereof in engagement with the latching shoulder 211 of the latch member 195, the spring 238 will press the contact plates 239 into engagement with the contacts 181a and 181b. The contact member 239 is moved upwardly out of engagement with the stationary contacts 181a and 181b, as follows.

The stop switch releasing lever 214, as shown in Figs. 5, 14 and 15, has an arcuate bar 242 curving rearwardly and then upwardly so that the forked rearward ends 243 thereof will lie, as shown in Fig. 15, on opposite sides of the lower end of the bar 224 and adjacent the movable contact 239. At the forward end of the lever 214 is a shoulder 244 positioned so as to be engaged by the shoulder 245 at the leftward end of the yoke 213, as clearly shown in Fig. 15. Below the shoulder 244, the lever 214 has an engagement body 246 which is used in the manual operation of the stop switch releasing lever 214, as will be hereinafter described. As may be clearly described with reference to Figs. 5 and 15, when the latch member 195 is raised so as to move the shoulder 211 upwardly from engagement with the face 226 of the lug 225, the yoke 213 is permitted to swing in anti-clockwise direction under force of the coil spring 233, with the result that the lever 223 will be raised from the position in which it is shown. At the same time, the anti-clockwise rotation of the yoke 213 will move the shoulder 245 downwardly, thereby applying pressure to the shoulder 244 of the lever 214 to rotate the same in anti-clockwise direction so that the forked ends 243 thereof will engage the contact member 239 on opposite sides of the lower end of the bar 224 and will raise this contact member 239 from engagement with the stationary contacts 181a and 181b. When the yoke 213 is in latched position, as shown in Figs. 5 and 15, and the contact member 239 is held by the spring 238 against the stationary contacts 181a and 181b, the releasing lever 214 may be manually rotated in anti-clockwise direction so that the contact member 239 will be raised from the position in which it is shown, thereby opening the stop switch 188.

The starting switch lever, as shown in Fig. 14, has a downwardly faced projection or lug 247, and through the lug 247 and the portion of the lever 215 adjacent thereto, there is an opening 248 of rectangular cross section leading downwardly from a counterbore 249 in which a compression spring 251 is seated. A metal bar 252 extends through the spring 249 and the opening 248, and has on its front end or lower end a moving contact member 239a similar in form to the contact member 239 but reversed. On the upper end of the bar 252 is a cap 253 of cup-shaped form, as shown in Fig. 19. In the circular top wall 254 of the cap 253 is a slot 255 defined by edge walls having depressions 256 therein. Notches 257 are formed in opposed relation near the upper end of the bar 248. The cap 253 is moved downwardly from the position in which it is shown in Fig. 19, so that the upper end of the bar 248 passes through the slot 255. When the slot 255 is aligned with the notches 257, the cap is rotated through an angle of 90° into the position in which it is shown in Fig. 14 so that shoulders 258 defining the upper edges of the notches 257 will rest in the depressions 256 of the cap 253. The spring 251 forces the bar 252 resiliently upwardly so as to normally hold the contact member 239a against the lower face of the lug 247.

As shown in Fig. 4, the lug 247 projects downwardly between the upper ends of the plates 183 of the contacts 182a and 182b, and the tongues 192 and 194 of these contacts pass horizontally into the spaces above the ends of the contact member 239a and on opposite sides of the lug 247, the result being that, when the starting switch 189 is open, as shown in Fig. 4, the ends of the contact 239a rest below and in spaced relation to the tongues 192 and 194 of the contacts 182a and 182b. As previously mentioned, the spring 233 imparts a force to the lever 215 tending to rotate the same in anti-clockwise direction to carry the contact 239a into its relatively open position. The forward portion of the switch lever 215, as shown in Figs. 4 and 14, has a manual engagement portion 258 lying in a plane below the shaft 202. Inward pressure against this engagement portion 258, as indicated by an arrow 259 in Fig. 4, will rotate the lever 215 in anti-clockwise direction, carrying the contact member 239a into engagement with the tongues 192 and 194 of the contact members 182a and 182b. The movement of the switch lever 215 is independent of the movement of the yoke 213.

The rearward end 260 of the start switch lever 215 projects into an opening 261 in the back wall 167 of the control switch body 166, where this rear end 260 is adapted to be engaged by a switch closing link 262, shown in Fig. 4. The link 262 consists of a relatively narrow plate or strip of metal 263 having a forwardly turned toe 264 at its upper end and a forwardly turned toe 265 at its lower end. The central portion of the link passes through a vertical slot 266 in the back of the wall 167 and has a vertical slot 267 therein engaged by rivets 268 which are secured to the back plate or wall 35 of the supporting member 33. The upper projection or toe 264 of the link 262 projects above a tongue 269 which extends rearwardly from the plate 97 of the movable switch assembly, and the lower projection or toe 265 of the link 262 projects forwardly under the rearward end 260 of the switch lever 215, so that when the electromagnet 136 is energized and the armature 101 is attracted upwardly, the extension 269 will engage the toe 264 to raise the link 262, with the result that the toe 265 will lift the rearward end 260 of the switch lever 215, rotating the same in anti-clockwise direction and moving the contact member 239a into engagement with the contact tongues 192 and 194 of the contacts 182a and 182b. By use of the parts above-described in this paragraph, the start switch 189 is automatically held closed whenever the electromagnet 136 is energized.

For holding thermostatically controlled overload releasing means, each side wall 168 and 169 of the control switch body 166 has a chamber or opening 271 disposed near its upper edge. The forward ends of the chambers 271 are open at the front edges of the walls 168 and 169, and the rear ends of these chambers connect through a small horizontal opening 272 with vertical channels 273, Fig. 3, formed in the rear face of the body 166. In the lower part of each vertical channel 273 is a counterbore 274, the forward ends of the counterbores 274 connecting with openings 275 which extend forwardly and horizontally near the lower edges of the walls 168 and 169 to steps or shoulders 276. As shown in Fig. 3, each chamber 271 may be lined with a layer of suitable heat insulating material 277, and in the upper part of each chamber 271 a bimetallic thermostatic strip 279 extends so that its forward end 280 projects under one of the dogs 208 of the overload latch member 195. By means of rivets 281, the rearward end of each thermostat 279 is secured to the forwardly turned upper end 282 of an adjustable supporting member 283. As shown in Fig. 20, the supporting member 283 comprises a vertically elongated plate 284 from the upper end of which the part 282 is forwardly bent at substantially a right angle, this upper part having holes 285 therein through which the rivets 281 pass to secure the bimetallic thermostat 279 in place. A pair of flanges 286 are bent forwardly from the sides of the plate 284 and have aligned openings 287 therein to receive a pin 288, Fig. 3, on which the supporting member 283 may swing through a limited distance. To support its pin 288, each supporting member 283 is provided with a bracket 289 having a base wall 291 and a pair of rearwardly extending flanges 292 with holes 293 therein for receiving the pin 288. The base wall 291 of the bracket 289 has an opening 294 therein through which a screw 295 may be extended to secure the same in a recess 296 formed for that purpose in the bottom wall of the vertical channel 273.

The plate 284 of the supporting member 283 is provided with an opening 297 aligned with the opening 294 of the bracket 289, through which opening 297 a screw-driver may be passed into engagement with the screw 295. In the extreme lower end of the plate 284 there is a threaded opening 298 to receive the rearward threaded end 299 of an adjusting screw 301, which is shown in perspective in Fig. 21. The screw 301 has a collar 302 formed near its forward end, and from this collar a relatively slender stem 303 forwardly extends. The circumferential face of the collar 302 is provided with knurling, as shown at 304 in Fig. 21. This knurling is adapted to be engaged by an engager 305, Fig. 22, to prevent free rotation of the screw 301 from any position of adjustment in which it has been set. The engager 305 is pointed, as shown, and is bent downwardly from the forward end of a U-shaped spring plate 306 formed integrally with a ring 307 having an opening 308 through which the screw 301 will pass.

In the installation of the thermostat 279, a coil spring 309 is placed in the counterbore 274. The adjustable supporting member 283 is then secured in place as shown in Fig. 3. After this, the ring 307 of the engager 305 is slid onto the screw 301 to such position that the engager 305 will engage the knurling 304, and the screw 301 is then inserted through the front end of the opening 275 and moved rearwardly to such position that the threaded end 299 thereof may be screwed into the opening 298 of the supporting member 283. The U-shaped spring plate 306 of the engager 305 is at this time brought to rest in a recess 311 above the forward end of the opening 275. After this, the screw 301 is rotated to bring the supporting member 283 and the thermostat 279 into a desired position. The desired position may be secured by rotating the screw 301 until the thermostat 279 will release the overload latch 195 at a stated or given current flow and at a given atmospheric temperature. Thereafter, the screw 301 is rotated to the left or right a number of degrees which has been determined empirically so that the thermostat 279 will release the overload latch 195 at the given current flow and at the atmospheric temperature at which the switch is intended to operate. This adjustment may be accurately made in the shop by attaching to the end 303 of the screw 301 one end of a sleeve to the other end of which a disc dial is secured normal to the axis of the screw 301 and having therearound a movable annular dial. The sleeve and disc dial may be rotated with the screw 301 until the thermostat 279 releases the overload latch 195 at the given current flow at the shop temperature. Since the variation in the positions of the screws 301 in different switches of this construction due to the differences in resistance to movement of the movable parts offered by friction have been allowed for when the screws 301 are set to release the overload latch 195 at the given current flow and shop temperature, the subsequent variation in the positions of the screws 301 which it is necessary to make to cause different switches of this construction to release the overload latch 195 at the stated current flow and a given operating temperature different from shop temperature are substantially the same. Therefore, the outer movable disc dial may be empirically marked to very accurately indicate the degree of rotation of the screw 301 necessary to cause the thermostat 279 to release the overload latch 195 at the given current flow and that temperature at which the switch is to work.

After the screw 301 is thus accurately adjusted to cause the thermostat 279 to release the overload latch 195 at the given current flow and the temperature at which the switch is intended to operate, the sleeve with its dials is removed and the stem 303, Fig. 21, is then bent downwardly from its forwardly extending position to the position in which it is shown in dotted lines 312 in Fig. 21 or in full lines in Figs. 1 and 3 so that the stem 303 may then serve as a handle or lever by which the adjusting screws 301 may be rotated.

At the front of each side wall 168 and 169 below the forward end or mouth of each chamber 271 is a face 313 from which an opening 314 rearwardly extends, as shown in Fig. 3, to receive a screw 315 which makes threaded engagement with a terminal plate 316 so as to hold the same against the face 313. The plates 316 are vertically aligned with the connector plates 71 and 72 of the service switch unit 50. As shown in Fig. 3, the connector plate 72 at the righthand of the switch unit is connected by means of a heater element 317 with the right-hand terminal plate 316. This heater element 317 comprises a strip of resistance metal 318, bent so as to provide a U-shaped loop 319 extending rearwardly into the right-hand chamber 271 and under the right-hand thermostat 279. The ends 321 and 322 of the strip 318 are bent respectively upwardly and downwardly so as to be secured by screws 323 and 324 to the plates 72 and 316 shown in Fig. 3. As shown in Fig. 1, a second heater element 317 is in a l'ke manner placed so as to connect the plate 71 and the left-hand plate 316 and so as to extend into the left-hand chamber 271. As illustrated in Fig. 29, there may be employed an alternative heater element 430 including a plate 431 secured by screw 324 to the plate 316 and attached to the end of a fine resistance wire 432 spirally wound upon a rigid hollow cylindrical sleeve 433 of suitable high-resistant material rigidly supported at its forward end within a collar 431a provided on the plate 431. The other end of the wire 432 is connected to the inner end of a conductor rod 434 disposed within the hollow cylindrical sleeve 433. The forward end of the conductor 434 is bent upwardly and flattened to provide a strip 435 which is secured by screw 323 to plate 72. Such a heater element may be employed in both of the chambers 271. Such a heater construction provides rigidity and accurate spacing of the heater element from the thermostat strip 279, and is particularly desirable for switch constructions operating at low amperage.

It is a feature of the invention to provide a simple and efficient form of manual control for the switch, whereby it may be operated at the cabinet 20, or may be opened and closed from remote points. As shown in Figs. 1 and 2, the cover 26 has a manually sw'ngable control switch operating member 325 permanently secured thereto, in such position that when the door or cover 26 is closed, as shown in Fig. 2, the member 325 will be in operative position relative to the switch unit 32, but when the cover 26 is swung into open position, as shown in Fig. 1, the member 325 will move therewith into a position away from the switch unit.

As shown in Fig. 23, the operating member 325 has a central body portion 326 of approximately semi-cylindrical form with a pair of arms 327a and 327b extending laterally therefrom and also a knob or lever 328 projecting forwardly therefrom. In the upper face of each arm 327a and 327b is a depression 329, these depressions being in positions to be engaged by downwardly faced, spherically rounded humps 331 depressed in the end portions of a spring plate 332 when these parts are in cooperative position on the inner face of the cover 26, as shown in Figs. 1 and 2. The members 325 and 332 have aligned openings 333 and 334 adapted to receive the upper part of a reset shaft 335 when the parts are assembled. As shown in Fig. 23, the reset shaft 335 has an upwardly faced shoulder 336 intermediate its ends, and on the lower end thereof has a knob 337 with a reduced lower end 338 projecting downwardly from downwardly faced shoulders 339.

In the front wall 341 of the cover 26, a depression 342 is formed, there being an opening 343 in the back wall of the depression through which the lever 328 and a portion of the body 326 of the switch operating member 325 may extend. A bracket 344 is secured to the inner face of the front wall 341 by means including a bolt 345. The lower end 346 of this bracket 344 is substantially even with the upper edge of the opening 343 and has an opening 347 to receive the upper extremity 348 of the shaft 335. The lower wall 349 of the cover 26 has an opening 351 through which the lower part 338 of the knob 337 projects. A coil spring 352 is placed on the shaft 335 so that its lower end bears against the knob 337 and its upper end bears against a cup 353 which rests against the lower face of the operating member 325. The spring plate 332 is disposed between the upper face of the member 325 and the lower end 346 of the bracket 344. When the operating member 325 is in centralized position, that is, with the lever 328 thereof projecting straight ahead, as shown in Figs. 1 and 2, the humps 331 of the spring plate 332 rest in the depressions 329 of the laterally extending arms 327a and 327b, thereby applying to the control member 325 a resilient force tending to hold the same in the stated centralized position. When the lever 328 is swung into start position, as indicated by dotted lines 328a in Fig. 2, the arms 327a and 327b will be rotated in clockwise direction, as viewed in Fig. 2, with the result that the arm 327a will be moved into a position below the cooperating hump 331, and the arm 327b will be moved into a position above the other cooperating hump 331, so that these humps then operate to resiliently hold the operating member 325 in the position indicated by dotted lines 328a. In a like manner, the humps 331 of the spring plate 332 will operate to hold the member 325 in stop position when the lever 328 thereof is swung to its extreme leftward position.

The shaft 335 is of such length and is so placed that, when the cover 26 of the cabinet 20 is closed, the upper extremity 348 of the shaft 335 will rest in a position beneath the reset dog 222 of the yoke 213, this relationship being shown in the wiring diagram, Fig. 15, and also in Fig. 2. When the cover 26 is in closed position, an upward force applied to the lower end 338 of the knob 337 to move the shaft 335 upwardly will cause the upper extremity 348 of the shaft 335 to engage the dog 222 and rotate the yoke 213 in clockwise direction, thereby carrying the shoulder 226 thereof into a position behind the plane defined by the shoulder 211 of the latch member 195, so that when the pressure on the reset member 222 is released, the shoulder 226 will come into engagement with the shoulder 211, as shown in Figs. 5 and 15, with the result that the moving contact 239 of the stop switch 188 will be held in engagement with the contacts 181a and 181b.

The inner faces 354 of the arms 327a and 327b, as shown in Figs. 2 and 23, have spherically rounded humps 355 thereon which lie adjacent the engagement portions 246 and 258 of the levers 214 and 215 when the door 26 is in closed position. If at this time the lever 328 of the operating member 325 is moved rightwardly, the lever 327a thereof will be moved inwardly, engaging the portion 258 of the lever 215 and causing anti-clockwise rotation of this lever 215 so as to swing the movable contact member 239a upwardly, thereby closing the start switch 189 of the control switch unit 51.

In a like manner, movement of the lever 328 leftwardly will cause the spherical hump 355 on the arm 327b to swing rearwardly into engagement with the portion 246 of the lever 214, thereby rotating this lever in anti-clockwise direction and causing the inner end thereof to move upwardly from the position in which it is shown in Fig. 5 to force the movable contact 239 upwardly out of engagement with the contacts 181a and 181b, thereby opening the stop switch 188 of the control circuit indicated in the wiring diagram Fig. 15.

The general use of the switch will be indicated by a description of its use with a three-wire circuit. As shown in Fig. 15, the control circuit of the switch includes a conductor 355, one end of which is connected through an angle clip 84 with the terminal plate 62a, and the other end of which conductor 355 is connected to the contact 182b. A jumper 356 may connect the contact 182a with the content 181b, this jumper 356 extending between terminal screws 357 disposed at the lower ends of the contacts 182a and 181b. A conductor 358 is extended to the angle connector clip 87 situated in the recess 86, Fig. 6, and from the clip 87 a conductor 359 is extended to the coil 137 of the electromagnet 136. Another conductor 361 is extended from the coil 137 to an angle clip 84 which is connected to the terminal plate 62b. Wires 362a, 362b and 362c, of a three-wire distributing system are connected respectively through the terminal plates 62a, 62b and 62c. An electrical device to be served, such, for example, as a motor 363, is connected through conductors 364, 365 and 366 which are respectively connected to the service terminal members consisting of the plates 316 and the lower end 367 of the strap 74. Connection of the conductors 364 and 366 to the plates 316 is accomplished through the use of terminal nuts 368 on the forward ends of the screws 315 and connection of the conductor 365 to the lower end 367 of the strap 74 is accomplished by use of a nut 369 on the outer end of a screw 371 which holds the lower end of the strap 74 against the front face 177, Fig. 11, of the dividing wall 174.

Assuming that the stop switch 188 has been first set by clockwise rotation of the yoke 213 to carry the shoulder 226 thereof behind the shoulder 211 of the flange member 195, and to bring the moving contact plate 239 into engagement with the contacts 181a and 181b, the service switch may be closed, and the motor 363 operated by swinging the lever 328 of the operating member 325 rightwardly so that the arm 327a thereof will force the portion 258 of the lever 215 rearwardly, to rotate such lever in anti-clockwise direction and carry the moving contact 239a upwardly into engagement with the contacts 182b and 182a, thereby completing the control circuit through the coil 137 of the electromagnet 136. This energization of the electromagnet 136 will rotate the movable switch assembly 94 in anti-clockwise direction, carrying the movable service switch contacts 129 into engagement with the stationary service switch contacts 78, with the result that the incoming wires 362a, 362b and 362c will be connected with the service conductors 364, 365 and 366 through the heater elements 317 and the strap 74, thereby operating the device 363 which is to be served with electrical energy.

Through the link 262, the upward movement of the armature 101 is transmitted to the start lever 215, with the result that the start switch 189 is held closed until the control circuit is broken in one of the following manners. Should a condition of overload exist in the service circuit causing either of the heater elements 317 to become overheated, the heat generated thereby will be applied to a bimetallic thermostat 279 causing the forward end 280 thereof to move upwardly, engaging a projection 208 of the latch member 195 and lifting this latch member 195 so as to move the latch shoulder 211 out of engagement with the shoulder 226 of the yoke 213, permitting the yoke 213 and the lever 214 to rotate in anti-clockwise direction whereby to raise the movable contact 239 out of engagement with the contacts 181a and 181b of the stop switch 188. Also, the control circuit may be opened manually by swinging the lever 328 of the operating member 325 leftwardly, so that the end 327b of the member 325 will engage the portion 246 of the lever 214 so as to rotate the member 214 in anti-clockwise direction, whereby the forked ends 243 thereof will engage the movable contact 239 and raise the same against the pressure of the spring 238.

As shown further in Fig. 15, conductors 372 and 373 may be extended to a remotely positioned switch 374, the inner ends of the conductors 372 and 373 being connected to the lower ends of the contacts 182a and 182b of the start switch 189 so that the remotely positioned switch 374 will be bridged across the contacts of the switch 189. Closing of the switch 374 will accomplish the same result as the moving of the contact 239a upwardly into engagement with the stationary contacts 182a and 182b. As shown in dotted lines, a remote stop switch 375 and conductors 376 and 377 may be substituted for the jumper 356. The switch 375 is normally closed so as to carry the control circuit from the contact 181b to the contact 182a and should this switch 375 be opened manually or by automatic means, such, for example, as the thermostat, the opening of the control circuit will result in the opening of the service switch by de-energizing the coil 137 of the electromagnet 136.

The heater elements 317 of the overload release are so designed relative to the heat responsive characteristics of the thermostat 279 that the overload mechanism will be released in accordance with the rating of the heating element when the handles or stems 303 of the screws 301 are in the positions in which they are shown in Fig. 1. In other words, the overload mechanism will release at 100% of the rating indicated on the overload heater elements. By turning the handles 303 to the left or to the right, the overload mechanism may be adjusted to release respectively at points either above or below the rating of the heater element used. When the handles are swung as far as they will go to the left, that is, in clockwise direction, the action of the right-hand thread at the rearward end of the screw 301, Fig. 3, will rotate the adjustable supporting member 283 in such manner as to lift the forward end 280 of the thermostat 279 sufficiently to cause the thermostat to release the latch member 195 at a point corresponding to 80% of the rating of the heater element 317. Likewise, the turning of the handles 303 as far as they will go to the right, that is, in anti-clockwise direction, will result in lowering the forward end 280 of the thermostat 279 to such an extent that the thermostat 279 will not release the overload latch 195 until the current flow has reached a value corresponding to 120% of the rating designated on the heater element 317. In accordance with the foregoing, the faces of the steps or shoulders 276, as shown in Fig. 11, are provided with the indicia 80, 100 and 120 for use in setting the handles 303 in accordance with the desired operation of the overload release mechanism.

The switch unit 32, previously described with thermostatic overload releasing means, may be readily converted into a type having a solder-pot type of overload release by merely substituting for the control unit 51 of Fig. 1 the control unit 51a shown in Figs. 24 to 27 inclusive. The control unit 51a employs a control switch body 166a having the same external configuration as the control switch body 166 of Figs. 1 to 5 inclusive and Fig. 11. The control switch body 166 may be removed from the supporting member 33 of the switch unit 32, and the control switch body 166a may be secured in place thereof, as shown in Figs. 24 to 27 inclusive. As shown in Figs. 24 and 27, the body 166a has side walls 378 extending from a back wall 379. Since, in this alternative form of the device, the heater elements 317, the thermostats 279 and their associated parts are eliminated, the side walls 378, although they are similar to the side walls 168 and 169, Fig. 11, in general appearance, do not have therein the heating chambers 271, the openings 272 or the vertical grooves or channels 273 to receive the thermostat supporting members 283. Instead, the side walls 378 have upper and lower end faces 381 and 382 disposed in a vertical plane and on opposite sides of a forwardly spaced recess 383 in each of the end walls 378.

From the bottom of each recess 383, an opening 384 extends horizontally and rearwardly through a side wall 378 to a recess 385 in the back of the control switch body 166a, as shown in Fig. 27. In the bottom wall of each recess 383, there is a channel 386 and these channels 386 face in lateral and horizontal directions toward each other so as to receive the ends 387 of a lateral shaft 388 having the same utility as the shaft 202 of Figs. 5 and 11. In each of the recesses 385, a plate 389 of insulating material, such as Bakelite, is placed and a screw 391 is extended upwardly through each plate 389 and through each opening 384 into threaded engagement with a plate 392 held in the bottom of the cooperating recess 383 so as to cover an end 387 of the shaft 388 to hold such shaft end in the groove 386 adapted to receive the same. In the inner face 393 of each side wall 378, as shown in Figs. 26 and 27, there is a groove 394 having its inner end 395 closed by a plate 389 placed in a recess 395. Each groove 394 is horizontal and lies in the same plane as the shaft 388. The outer end 396 of each groove 394 terminates behind the groove 386 with which it is aligned and has a forwardly extending undercut recess 397 at the outer extremity thereof.

In each of the horizontal grooves 394 is a thrust member 398, the form of which is best shown in the perspective view, Fig. 28. Each thrust member 398 has a rectangular body 399 molded from an insulating material with an edge portion 401 lying outside the line of division indicated by a dotted line 402, which edge portion 401 is of such width that it will fit into a groove 394 of Figs. 26 and 27. The forward end of this edge portion 401 has a lip or dog adapted to project forwardly into an undercut recess 397 at the forward end of the groove 394, the engagement of the lip 403 with the recess 397 holding the edge portion 401 in its cooperating groove 394. At the forward end of each body 399, forwardly diverging thrust arms 404 and 405 are formed, and projecting forwardly from each thrust arm 404 is a flat spring 406 having an inwardly bent end 407 forming a pawl. It will be perceived that the thrust members 398 are identical in form but are reversed in position when placed in the grooves 394 of the control switch body 166a.

As shown in Figs. 26 and 27, the pawls 407 of the thrust members 398 are adapted to engage ratchet wheels 408 forming part of solder or solder-pot type overload releasing members 409. As further shown in Fig. 28, each of the releasing members 409 has a body 411 with an internal chamber containing a quantity of solder engaging the inner ends of the shaft 412 which extend into the bodies 411 from the ratchet wheels 408. As shown in Figs. 26 and 27, each thrust member 398 has a cavity 413 in its inner end containing a spring 414, the inner end of which bears against a plate 389 so that the spring 414 tends to force the thrust member 398 forwardly. When the thrust member 398 is forced rearwardly in its groove 394 against the pressure of its spring 414, the pawl 407 at its outer end will engage a side tooth 415 of a ratchet wheel 408, as shown in Fig. 28, and forward movement of the thrust member 398 will be prevented by the engagement of its pawl 407 with the ratchet wheel 408.

The overload releasing members 409 are of commercially accepted type and have end plates 416 and 417 by which they are connected into an electric circuit. The overload releasing members 409 are secured with their end plates 416 and 417 overlying the end faces 381 and 382. When in such position, each releasing member 409 will be so positioned that its body 411 will project into a recess 383, and its ratchet wheel 408 will be in position for engagement by a pawl 407 of a thrust member 398. Nuts 418 and 419 are employed to clamp the end plates 416 and 417 in place, and under each end plate 416, a Z-shaped strap 421 is clamped for connection of each end plate 416 with the cooperating terminal plate 71 or 72 of the service switch unit 50. Under each plate 417, a clip or plate 422 is clamped, these plates 422 having inwardly bent lower ends 423 provided with terminal screws 424 to which service wires, such as the conductors 364 and 366 of Fig. 15, may be connected.

The control switch body 166a carries stop switch contacts 181a and 181b, and start switch contacts 182a and 182b on opposite sides of a dividing wall 174 which supports the strap or buss bar 74, in the same manner as shown in Figs. 1 to 5 inclusive. The form of control switch mechanism shown in Figs. 24 to 28 inclusive includes a stop switch releasing lever 214, a start switch lever 215 and contacts 239a, in the form shown in Figs. 4, 5 and 14, but this latter form of the invention shown in Figs. 24 to 28 inclusive has a yoke 425 which is like the yoke 213 of Fig. 13 in that it has a substantially semi-cylindrical wall 216 with end walls 217 and 218, a reset dog 222 and a switch lever 223, but instead of the latch lug 225 shown in Fig. 13, the yoke 425 has laterally extending lugs 426 at the leftward and rightward ends thereof which overlie the thrust arms 405 and 404 of the leftward and rightward thrust members 398. As shown in Fig. 25, the stop switch lever 223 carried by the yoke 425 has a downwardly projecting bar 224 carrying a moving contact 239 adapted to engage the contacts 181a and 181b. A bracket 427 secured to the back wall of the control switch body 166a carries a compression spring 428 in such position that it will engage a lug 429 formed on the upper face of the lever 223, this spring 428 having sufficient strength to force the lever 223 downwardly and carry the contact 239 into engagement with the contacts 181a and 181b when the thrust members 398 are in retracted positions, as shown in Figs. 25, 26 and 27. The levers 214 and 215 and the yoke 425 are mounted on the shaft 388 and the contact 239 may be moved out of engagement with the contacts 181a and 181b by manual rotation of the lever 214 in anti-clockwise direction as described relative to Fig. 5. Should an overload current be carried through either of the overload release devices 409, the solder within the bodies 411 of such devices, or either of them, will melt, permitting either one or both of the ratchet wheels 408 to rotate. The release of a ratchet wheel 408 in this manner will permit the thrust member 398 to move forwardly under pressure of its spring 414, with the result that a lug 426 on the yoke 425 will be forced forwardly, causing the yoke 425 to rotate in anti-clockwise direction, thereby moving the lever 223 and the switch contact 239 upwardly against the pressure of the spring 428 and thereby moving the contact 239 out of engagement with the stationary contacts 181a and 181b. For example, should an overload current through the overload releasing device 409 shown in Fig. 26 cause the melting of the solder therein and the release of the associated ratchet wheel 408, the thrust member 398 shown in Fig. 26 will be moved leftwardly or forwardly and the thrust arm 405 thereof will bear against the lug 426 shown in Fig. 26 to rotate the yoke 425 in anti-clockwise direction. After the solder in one or both of the devices 409 has again solidified, the overload release mechanism may be reset by rotating the yoke 425 in clockwise direction, which is accomplished by use of a reset shaft 335, such as shown in Figs. 1, 2 and 15. When the yoke 425 is moved in anti-clockwise direction, one or both of the lugs 426 thereof will engage its cooperating thrust member 398 and force the same rearwardly, and both of the pawls 407 will then engage teeth of the respective ratchet wheels 408 so that the thrust members 398 will be held in retracted positions.

We claim as our invention:

1. In a switch of the character described, the combination of: upper and lower walls spaced apart so as to define an opening; pairs of contacts spaced apart laterally in said opening, one contact of each pair projecting downward from the upper of said walls and the other contact of each pair projecting upward from the lower of said walls; a body in the rearward part of said opening; means for mounting said body so that it may move forward and rearward in said opening; movable contacts mounted on the front of said body in laterally spaced relation and in such position that each of them will cooperate with a pair of said first named contacts; and a cover adapted to be secured to the front of said walls so as to close said opening, said cover having wall members projecting inwardly from the rearward face thereof and in positions to lie between adjacent pairs of laterally spaced contacts so as to form in said opening compartments in which pairs of said contacts are disposed.

2. In a switch of the character described, the combination of: upper and lower walls spaced apart so as to define an opening; pairs of contacts spaced apart laterally in said opening, one contact of each pair projecting downward from the upper of said walls and the other contact of each pair projecting upward from the lower of said walls; a body in the rearward part of said opening; means for mounting said body so that it may move forward and rearward in said opening; movable contacts mounted on the front of said body in laterally spaced relation and in such position that each of them will cooperate with a pair of said first named contacts, there being vertical wall elements projecting from said body in positions between said movable contacts; and a cover adapted to be secured to the front of said walls so as to close said opening, said cover having wall members projecting rearwardly therefrom in cooperating relation to said wall elements of said body so as to form in said opening compartments each containing one of said pairs of contacts and one of said movable contacts.

3. In a switch of the character described, the combination of: upper and lower walls spaced apart so as to define an opening; pairs of contacts spaced apart laterally in said opening, one contact of each pair projecting downwardly from the upper of said walls and the other contact of each pair projecting upwardly from the lower of said walls; a body in the rearward part of said opening; means for mounting said body so that it may move forward and rearward in said opening; movable contacts mounted on the front of said body in laterally spaced relation and in such position that each of them will cooperate with a pair of said first named contacts; and a cover adapted to be secured to the front of said walls so as to close said opening, said cover having front dividing wall means projecting rearwardly therefrom between adjacent pairs of said pairs of contacts, there being rear dividing wall means projecting from said body between adjacent movable contacts to cooperate in forming contact chambers, one of said dividing wall means having a recess in its projecting end to slidably receive a portion of the other of said dividing wall means.

4. A switch for mounting in a housing having a front door, said switch having: an insulating base in said housing, said base having walls providing a front face and a chamber opening on said front face at a location opposite to and accessible through said door; a plurality of pairs of contacts removably mounted on the forward portion of said base in positions exposed to the interior of said chamber, said contacts being accessible for removal through said door; a contact carrier rearwardly of said contacts and providing wall means for the rear of said chamber, said carrier being movable forwardly toward said contacts and vice versa; a plurality of contact means on said carrier corresponding to said pairs of contacts and adapted to cooperate therewith in opening and closing circuits therethrough when said carrier is moved forwardly and rearwardly; an insulating cover removably mounted on said front face of the base to cover both said chamber and said contacts to keep an operator from accidentally touching said contacts and contact means when the housing door is open for purposes other than inspecting or servicing said contacts and contact means; and wall members carried by said cover in positions to extend between pairs of said contacts to cooperate with said carrier in forming separate compartments in the chamber for the pairs of contacts when said carrier is in its forward circuit-closing position, said wall members of the cover extending into overlapping relation with portions of the carrier when the carrier is in the circuit-closing position whereby said compartments are maintained and said pairs of contacts isolated from each other in a positive manner during at least a portion of the circuit-opening movement of the carrier.

5. A switch for mounting in a housing having a front door, said switch having: an insulating base adapted for mounting in said housing, said base having walls providing a front face and an opening on said front face at a location to be opposite to and accessible through said housing door; a plurality of pairs of contacts removably mounted on said base in positions extending over said opening, said contacts being accessible for removal through said door; a contact carrier to the rear of said contacts; a plurality of contact means on said carrier corresponding to said pairs of contacts, said carrier being movable in said opening to carry said contact means forwardly into circuit-closing relation with said pairs of contacts and vice versa; an insulating cover removably mounted on said base covering both said opening and said contacts to keep an operator from accidentally touching said contacts and contact means when the housing door is opened for purposes other than inspecting or servicing said contacts and contact means; wall members extending forwardly from said carrier, each of said wall members lying between two of said contact means; and wall members extending rearwardly from said cover in positions to cooperate with said wall members on the carrier to form contact compartments.

6. A switch for mounting in a housing having a front door, said switch having: an insulating base adapted for mounting in said housing, said base having walls providing a front face and a chamber opening on said front face at a location to be opposite to and accessible through said housing door; a plurality of pairs of contacts removably mounted on said face of the base in positions extending at least partially over said opening; a contact carrier movable forwardly through said chamber towards said contacts; a plurality of contact means on said carrier corresponding to said pairs of contacts and cooperative therewith to close circuits therethrough when the carrier moves forward and vice versa; and an insulating cover removably mounted on said base covering both said opening and said contacts, said cover having wall members normally extending rearwardly between pairs of said contacts and being adapted to cooperate with said carrier to form compartments in said chamber for each of said pairs of contacts.

7. A switch of the character described having in combination: insulating means providing walls forming in part a chamber opening to the front of the switch; a pair of contacts on said insulating means exposed to the interior of said chamber; a wall means removably mounted on said insulating means covering said contacts and serving as a front wall for said chamber; a second wall means serving as a rear wall for said chamber; contact means mounted on said second wall means to cooperate with said pair of contacts; and a carrier supporting said second wall means and adapted to move said wall means towards and away from said pair of contacts.

8. A switch of the character described having in combination: insulating means providing a front face and walls forming in part a chamber opening on said front face; a plurality of pairs of contacts mounted on said insulating means in positions to be exposed to the interior of said chamber; a wall means removably mounted on said face covering said contacts and serving as a front wall for said chamber; a second wall means serving as a rear wall for said chamber; contact means mounted on said second wall means to cooperate with said pairs of contacts; a carrier supporting said second wall means and adapted to move said second wall means towards and away from said pairs of contacts; and barriers carried by one of said wall means disposed to divide said chamber into compartments for said pairs of contacts.

JOSEPH H. PENGILLY.
JOHN G. MOYEN.
HAROLD A. DUVALL.
LAWRENCE G. MAECHTLEN.